United States Patent
Kamata et al.

(10) Patent No.: US 7,856,491 B2
(45) Date of Patent: Dec. 21, 2010

(54) REMOVABLE MEDIA DEVICE CAPABLE OF NOTIFYING NETWORK DEVICE OF INSERTION OF REMOVABLE MEDIA

(75) Inventors: Megumi Kamata, Nagoya (JP); Minoru Oishi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 390 days.

(21) Appl. No.: 11/676,376

(22) Filed: Feb. 19, 2007

(65) Prior Publication Data
US 2007/0198649 A1    Aug. 23, 2007

(30) Foreign Application Priority Data
Feb. 20, 2006    (JP)    ............... 2006-041901

(51) Int. Cl.
G06F 15/16    (2006.01)
(52) U.S. Cl. ................ 709/222; 709/250; 709/207; 710/300; 710/13; 710/8; 711/115
(58) Field of Classification Search ........... 709/203, 709/204, 222, 250, 207; 710/8, 13, 300; 711/115
See application file for complete search history.

(56) References Cited

U.S. PATENT DOCUMENTS 7,171,447 B2 *  1/2007  Kawamoto et al. .......... 709/204
7,515,289 B2 *  4/2009  Ohtuka ...................... 358/1.15
2002/0049710 A1  4/2002  Kusumoto
2004/0008374 A1 *  1/2004  Choi ......................... 358/1.16
2004/0212831 A1 * 10/2004  Imai et al. .................. 358/1.16

FOREIGN PATENT DOCUMENTS

| JP | 4-79666 A | 3/1992 |
| JP | 2002-16866 A | 1/2002 |
| JP | 2002-216080 A | 8/2002 |
| JP | 2003-150881 A | 5/2003 |
| JP | 2003223424 * | 8/2003 |
| JP | 2004-110877 A | 4/2004 |
| JP | 2004-172842 | 6/2004 |
| JP | 2003-223424 A | 2/2010 |

OTHER PUBLICATIONS

JP Office Action dtd Feb. 2, 2010, JP Appln. 2006-041901, partial English translation.

* cited by examiner

*Primary Examiner*—Jungwon Chang
(74) *Attorney, Agent, or Firm*—Banner & Witcoff, Ltd.

(57) ABSTRACT

When a memory card is inserted into a card reader of an MFP, a selected network address is set as a connection destination, and a memory card insertion signal is transmitted to the connection destination. On the other hand, when no network address is selected, all network addresses stored in the memory card are set as connection destinations, and the memory card insertion signal is transmitted to the set connection destinations. The memory card insertion signal includes information indicating the insertion of the memory card into the card reader and a network address of the MFP.

14 Claims, 5 Drawing Sheets

REMOVABLE MEDIA DEVICE CAPABLE OF NOTIFYING NETWORK DEVICE OF INSERTION OF REMOVABLE MEDIA

CROSS REFERENCE TO RELATED APPLICATION

This application claims priority from Japanese Patent Application No. 2006-041901 filed Feb. 20, 2006. The entire content of this priority application is incorporated herein by reference.

TECHNICAL FIELD

The disclosure relates to a removable media device, a storage medium storing a removable media device control program, and a storage medium storing a network device control program capable of notifying of insertion of removable media into the removable media device.

BACKGROUND

Image data photographed by a digital camera or such data as text data created on a computer is stored in a removable memory card (removable media). When the memory card is inserted into a card reader (removable media device) connected to a network, data stored in the memory card can be input to a computer connected to the network.

For example, Japanese Patent-Application Publication No. 2004-172842 discloses a printer that can perform printing by directly receiving image data photographed by a digital camera from a memory card which is inserted into the printer body. Also, the image data stored in the memory card inserted into the printer body can be stored in a storage device of a computer through a network.

However, in order for a user to acquire data stored in the memory card on the computer, the user needs to insert the memory card into the card reader after checking and inputting the network address of the card reader, which is very troublesome work. Further, in order to detect whether the memory card is inserted into the card reader in a proper manner, the user needs to access the card reader from the computer and receive a reply therefrom. This degrades operability and results in inconvenience.

SUMMARY

In view of the foregoing, it is an object of the invention to provide a removable media device, a storage medium storing a removable media device control program, and a storage medium storing a network device control program capable of notifying of insertion of removable media into the removable media device.

In order to attain the above and other objects, the invention provides a removable media device communicable with a plurality of network devices via a network. The removable media device includes an insert section into which a removable media is detachably insertable, an insertion detecting unit that detects the removable media inserted into the insert section, a reading unit that reads an identification information from the removable media when the insertion detecting unit has detected the removable media, and a notifying unit that notifies one of the network devices identified by the identification information of the insertion of the removable media.

There is also provided a storage medium storing a set of program instructions executable on a removable media device and usable for controlling the removable media device. The instructions includes: detecting insertion of a removable media into an insert section; reading an identification information from the removable media when the insertion of the removable media is detected, the identification information identifying a network device; and notifying, through a network, the network device identified by the identification information read from the removable media of the insertion of the removable media.

There is also provided a storage medium storing a set of program instructions executable on a network device and usable for controlling the network device. The instructions includes: detecting reception of a notification signal from a removable media device through a network, the notification signal indicating that a removable media has been mounted on the removable media device; and displaying information on a display when the reception of the notification signal was detected, the information notifying that the removable media has been mounted on the removable media device.

BRIEF DESCRIPTION OF THE DRAWINGS

An illustrative embodiment in accordance with the invention will be described in detail with reference to the following figures wherein.

DETAILED DESCRIPTION

Figure 1:
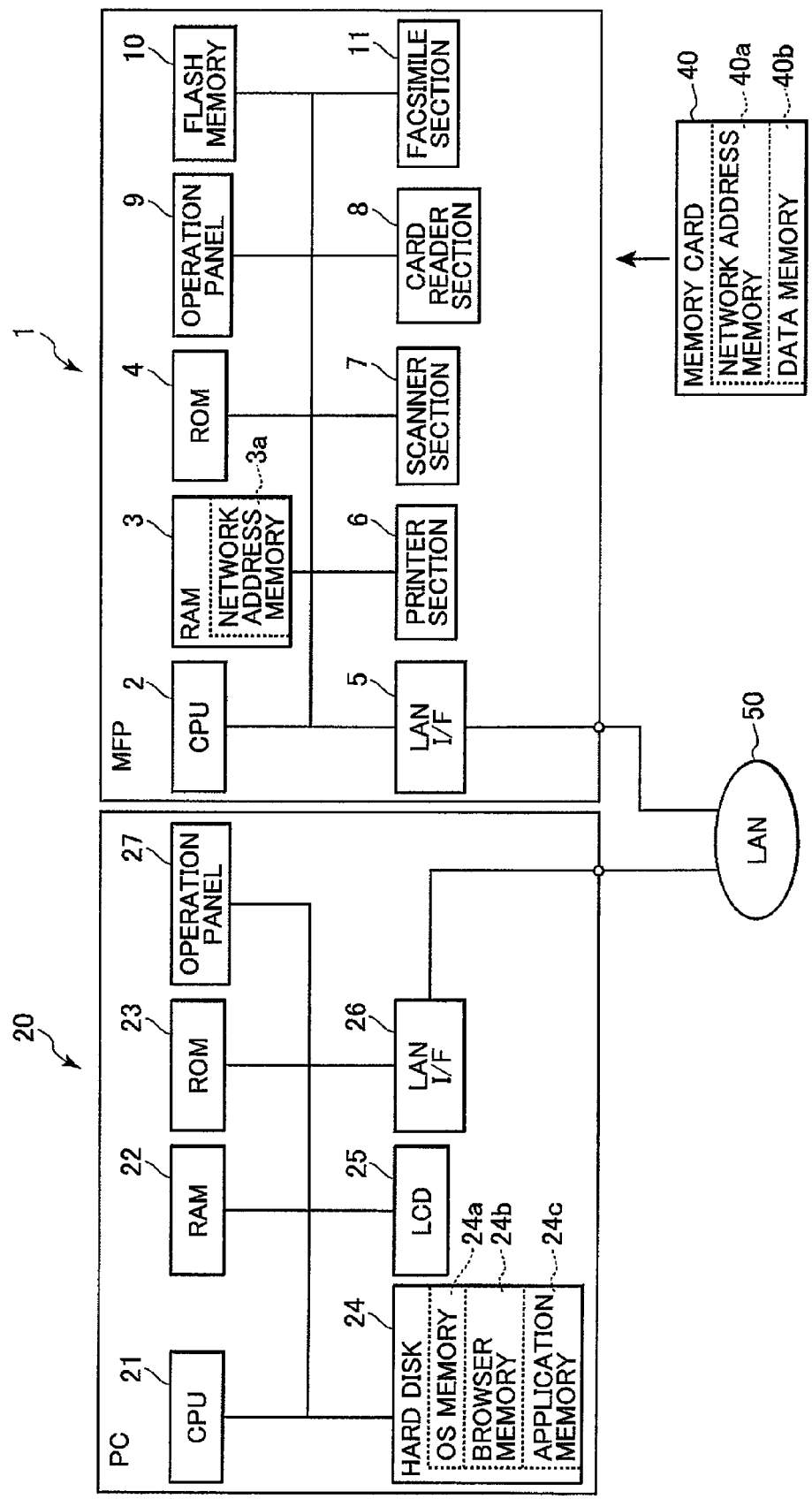
FIG. 1 is a block diagram showing a communication system including a multi function peripheral (MFP) according to an embodiment of the invention.

An embodiment of the invention will be described while referring to the accompanying drawings wherein like parts and components are designated by the same reference numerals to avoid duplicating description.

FIG. 1 is a block diagram showing a configuration of a communication system including a Multi Function Peripheral (MFP) 1 and a plurality of personal computers (PCs) 20 connected to the MFP 1 through a Local Area Network (LAN) 50.

The MFP 1 is provided with various functions, such as a photo media capture function, a printer function, a copy function, a scanner function, and a facsimile function.

As shown in FIG. 1, the MFP 1 includes a central processing unit (CPU) 2, a random-access memory (RAM) 3, a read-only memory (ROM) 4, a LAN interface (LAN I/F) 5, a printer section 6, a scanner section 7, a card reader section 8, an operation panel 9, a flash memory 10, a facsimile section 11, and the like.

The CPU 2 controls the entire operation of the MFP 1. The RAM 3 has a work area for temporarily storing data, such as variables, required when the CPU 2 executes various programs. The RAM 3 has a network address memory 3a. The ROM 4 stores various control programs executed by the CPU 2 and fixed value data.

Figure 2:
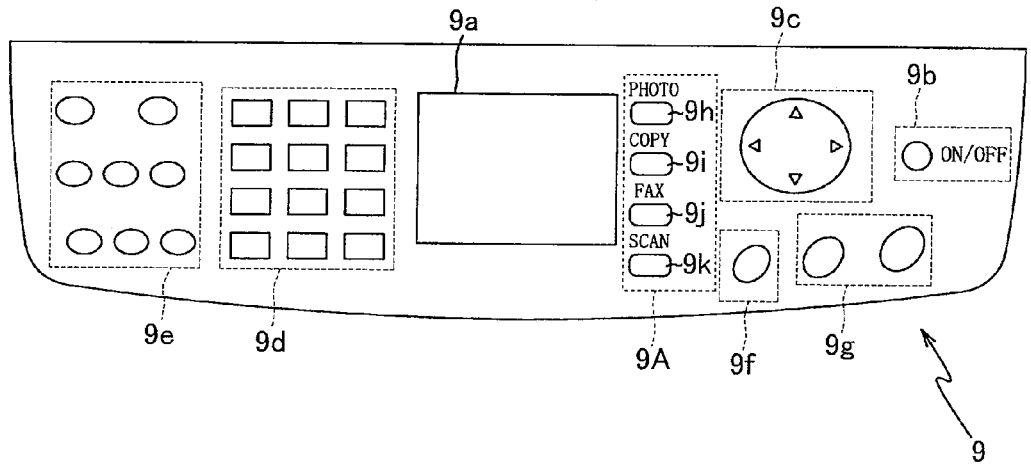
FIG. 2 is a plan view of an operation panel in the MFP.

A user can enter various instructions to the MFP 1 by operating the operation panel 9. As shown in FIG. 2, the operation panel 9 includes a liquid crystal display (LCD) 9a, mode selection keys 9A, a power button 9b, a menu set key 9c, numeral keys 9d, setting buttons 9e, a stop button 9f, and start buttons 9g.

The LCD 9a displays various information of the MFP 1. The LCD 9a also displays a setting window allowing a user to set a function or setting value at function setting time as described later.

The mode selection keys 9A includes a PCC mode key 9h, a copy mode key 9i, a facsimile mode key 9j, and a scan mode key 9k. The PCC mode key 9h is a key for setting the MFP 1 into a photo media capture mode in which the photo media capture function is executed. The copy mode key 9i is a key for setting the MFP 1 in a copy mode in which the copy function is executed. The facsimile mode key 9j is a key for setting the MFP 1 in a facsimile mode in which the facsimile function is executed. The scan mode key 9k is a key for setting the MFP 1 in a scanner mode in which the scanner function is executed. Upon depression of one of the mode selection keys 9A, the MFP 1 executes a function corresponding to the depressed mode selection key 9A.

When the power button 9b is depressed in a power-OFF state of the MFP 1, a power is applied to the MFP 1. When the power button 9b is depressed in this power-ON state, the MFP is turned OFF.

The menu set key 9c is a key for selecting a function executed by the MFP 1 or setting value from among choices displayed on the LCD 9a. When the left, right, top, or bottom edge portion of the menu set key 9c is depressed, a cursor displayed on the LCD 9a is moved in the left, right, top, or bottom direction. When the center of the menu set key 9c is depressed when the cursor is placed on a choice corresponding to a desired function or setting value, the function or setting value designated by the cursor is set.

The numeral keys 9d are used for inputting a numeric value or character, such as facsimile number or user number specifying identification information. For example, when the MFP 1 is set in the facsimile mode, telephone number of a transmission destination can be input using the numeral keys 9d.

The setting buttons 9e are used for specifying execution of a specific function in various modes (e.g., on-hook dial function in the facsimile mode). The stop button 9f is used for stopping a function being executed. The start buttons 9g are used for specifying start of execution of functions in the facsimile mode or copy mode.

Referring to FIG. 1, the card reader section 8 has a slot (not shown) into which a memory card 40 can be removably inserted. The card reader section 8 can read out data stored in an inserted memory card 40 and can write desired data in the inserted memory card 40.

The flash memory 10 is a non-volatile memory that can write/read various data. The LAN I/F 5 is the interface of the LAN 50. Data stored in the memory card 40 inserted into the card reader section 8 can be transmitted to the PC 20 connected to the LAN 50 through the LAN I/F 5. In the present embodiment, communication is performed using a File Transfer Protocol (FTP) for file transfer.

The printer section 6 is an ink-jet printer that performs printing to a recording paper set in a predetermined feed position (not shown) based on an instruction from the CPU 2. Although not shown in the drawings, the printer section 6 includes a recording paper feeding motor for feeding the recording paper, a print head for ejecting ink onto the recording paper, and a carriage motor for moving a carriage mounting the print head. When the MFP 1 is set in the photo media capture mode, image data or text data stored in the memory card 40 inserted into the card reader section 8 can be printed by the printer section 6.

The scanner section 7 reads out an image from a document set on a predetermined read-out position (not shown) and generates image data of the image based on an instruction from the CPU 2. The image data read out by the scanner section 7 can be transmitted to the PC 20 through the LAN 50. When the MFP 1 is set in the copy mode, the image data generated by the scanner section 7 is printed onto a recording paper by the printer section 6. When the MFP 1 is set in the scanner mode, the image data generated by the scanner section 7 is stored in a predetermined storage area in the RAM 3.

The memory card 40 is a flash memory which is a rewritable memory and retains the memory even when power is turned OFF. Various types of memory cards (e.g., SD card or xD card) are marketed from various manufacturers.

The memory card 40 includes a network address memory 40a and a data memory 40b. A network address, such as a node name or IP address, for identifying a network device, such as the PC 20, which is capable of accessing the memory card 40 through the LAN 50, is previously stored in the network address memory 40a. The network address memory 40a can store a plurality network addresses. The data memory 40b is for storing various data including image data photographed by a digital camera and text data created by a computer.

The facsimile section 11 can transmit, through a phone line (not shown), image data read out by the scanner section 7 or data received through the LAN 50. The facsimile section 11 also can print data received through the phone line using the printer section 6, and transmit data received through the phone line to the PC 20 through the LAN 50.

Next, a configuration of the PCs 20 will be described. Each PC 20 includes a CPU 21; a RAM 22 for temporarily storing data or program required for various processing executed by the CPU 21; a ROM 23 for storing various control programs executed by the CPU 21 and fixed value data; a hard disk 24 which is a rewritable and non-volatile memory for storing various programs and various settings; an operation section 27 including a mouse and a keyboard having a plurality of operation input keys for setting various functions; an LCD 25 for displaying various information; and a LAN I/F 26 for connecting to the LAN 50.

The hard disk 24 has an Operating System (OS) memory 24a for storing an OS; a browser memory 24b for storing a web browser; and an application memory 24c for storing various application programs.

Figure 3:
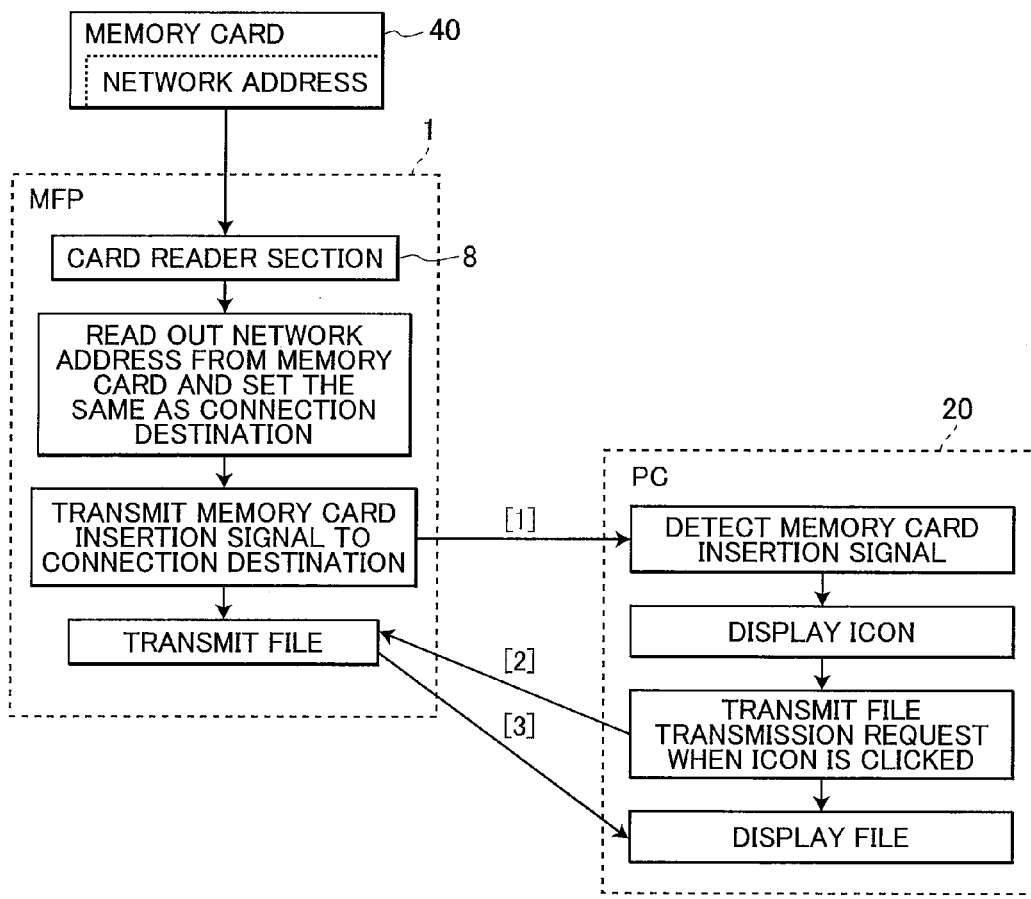
FIG. 3 is a conceptual view showing the outline of processing performed in the MFP and a PC in FIG. 1.

Next, the outline of processing performed by the MFP 1 and the PC 20 will be described with reference to FIG. 3.

When a plurality of network addresses is stored in the memory card 40, the user can select one of the network addresses. More specifically, the user inputs a numeric value using the numeral keys 9d to select a desired network address. For example, when three network addresses are stored in the memory card 40, numbers 1 to 3 are assigned to the respective network addresses. Thus, the user can select a desired network address by inputting any of numbers 1 to 3. The numeric value input in this manner is stored in the network address memory 3a of the RAM 3. It should be noted that the user is not necessarily selecting one of the network addresses even when the plurality of network addresses is stored in the memory card 40.

Then, the memory card 40 is inserted into the card reader section 8. When the memory card 40 is inserted after a network address has been selected, the selected network address is set as a connection destination, and a memory card insertion signal is transmitted to the connection destination. The memory card insertion signal indicates that the memory card 40 has been inserted and notifies the connection destination of the network address of the MFP 1. On the other hand, when the memory card 40 is inserted without selecting any of the network addresses, all of the network addresses stored in the memory card 40 are set as connection destinations, and the memory card insertion signal is transmitted to the connection destinations.

An application program stored in the application memory 24c of the PC 20 detects, at any one given point in time, whether or not the memory card insertion signal has been received.

Figure 4A:
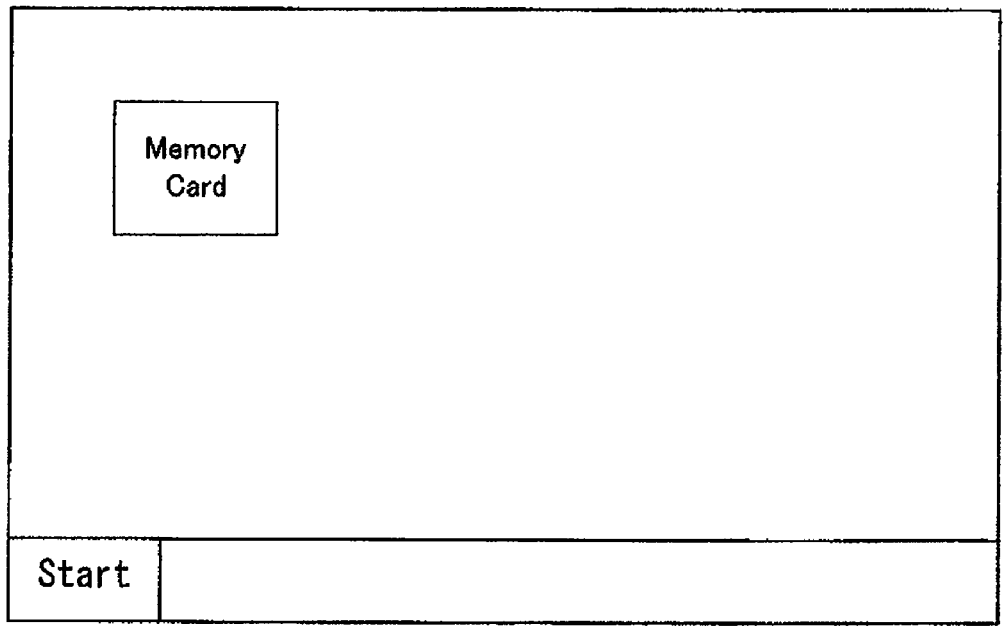
FIG. 4(a) is a view showing a window displayed on a liquid crystal display of the PC.

When the reception of the memory card insertion signal is detected, the application program activates a Web browser stored on the browser memory 24b and displays an icon as shown in FIG. 4(a) on the LCD 25, thereby informing the user of the PC 20 that the memory card 40 has been inserted properly. When the displayed icon is clicked by the mouse, the PC 20 refers to the network address of the MFP 1 indicated by the received memory card insertion signal and transmits a file transmission request signal to the MFP 1, requiring the MFP 1 to transmit a file stored in the memory card 40.

Upon receiving the file transmission request signal, the MFP 1 transmits a file (data) stored in the data memory 40b of the memory card 40 to the PC 20, and the PC 20 displays the received file.

Figure 5:
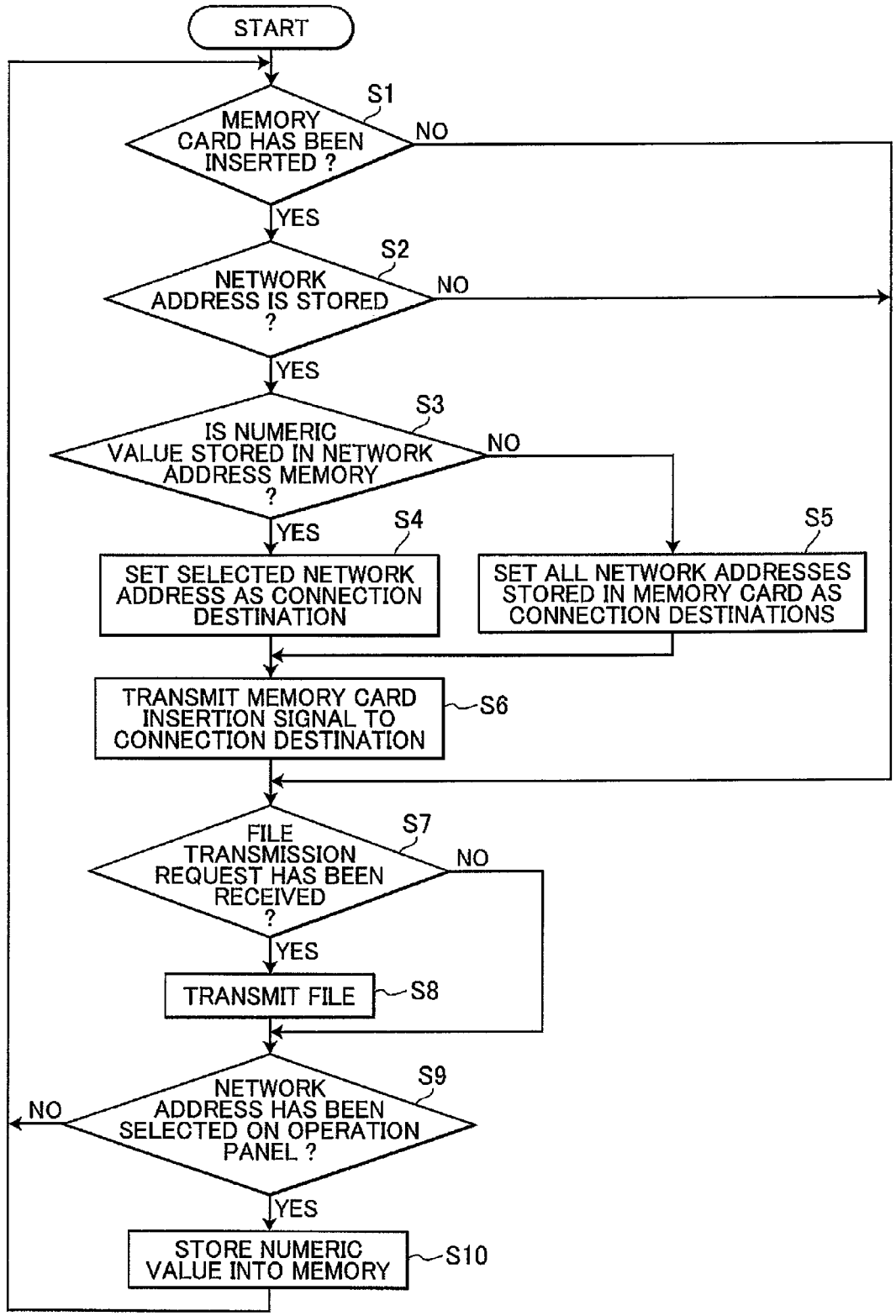
FIG. 5 is a flowchart representing processing executed in the MFP.

Next, processing executed by the CPU 2 of the MFP 1 will be described with reference to a flowchart in FIG. 5. This processing is activated at the time of when the power to the MFP 1 is turned ON and continues until the power to the MFP 1 is turned OFF.

First, it is determined whether or not the memory card 40 has been inserted into the card reader section 8 (S1). If so (S1: Yes), it is determined whether or not any network address is stored in the memory card 40 (S2). If so (S2: Yes), it is determined whether or not a numeric value indicating a selected network address is stored in the network address memory 3a.

If so (S3: Yes), this means that a network address corresponding to the numeric value has been selected, and the network address is read from the memory card 40 and set as a connection destination (S4), and the process proceeds to S6. On the other hand, if not (S3: No), this means no network address has been selected, and thus all of the network addresses stored in the memory card 40 are read and set as connection destinations (S5), and the process proceeds to S6.

In S6, the memory card insertion signal is transmitted to the set connection destination(s) (S6), and the process proceeds to S7.

In S7, it is determined whether or not the file transmission request has been received from any of the PCs 20 through the LAN 50 (S7). If so (S7: Yes), then a file is read out from the data memory 40b of the memory card 40 and transmitted to the PC 20 through the LAN 50 (S8), and the process proceeds to S9.

On the other hand, if not (S7: No), the process proceeds directly to S9. In S9, it is determined whether or not a network address has been selected on the operation panel 9 by inputting a corresponding numeric value. It should be noted that this determination may be made only when it is determined in S1 that the card memory 40 has not been inserted into the card reader section 8.

If so (S9: Yes), the inputted numeric value is stored in the network address memory 3a of the RAM 3 (S10), and the process returns to S1. On the other hand, if not (S9: No), then the process directly returns to S1.

Next, processing executed in each PC 20 will be described with reference to a flowchart in FIG. 6. This processing is performed by a resident application program and is started simultaneously with the start of the OS after a power is applied to the PC 20.

First, it is determined whether or not the memory card insertion signal has been received (S11). If so (S11: Yes), the web browser is activated, and the web browser displays an icon as shown in FIG. 4(a) on the LCD 25 (S12). Then, it is determined whether or not the icon has been clicked (S13). If so (S13: Yes), the file transmission request signal is transmitted to the network address of the MFP 1 included in the memory card insertion signal (S14).

Then, it is determined whether or not a file has been received through the LAN 50 (S15). If so (S15: Yes), then the received file is displayed on the LCD 25 (S16), and the process returns to S11. On the other hand, if not (S15: No), then the process directly returns to S11.

If a negative determination is made in S11 or S13, the process proceeds to S15.

As described above, according to the present embodiment of the invention, the memory card insertion signal is automatically transmitted when the memory card 40 is inserted into the card reader section 8. Therefore, a user on the PC 20 side can easily recognize that the memory card 40 has been inserted properly.

Also, a user can select any of the PCs 20 connected to the MFP 1 so that the memory card insertion signal is only transmitted to the selected PC 20. Therefore, a user can access the memory card 40 from the selected PC 20 with improved convenience and usability.

Further, the memory card insertion signal can be transmitted to all of the PCs 20 connected to the MFP 1. Therefore, a user can access the memory card 40 from any of the PCs 20. This improves convenience and usability.

Since the network address of the MFP is included in the memory card insertion signal, a user can easily access the memory card 40 inserted into the MFP 1 without the need to set the network address of the MFP 1.

Moreover, a user can request transmission of data (file) stored in the memory card 40 simply by clicking the icon displayed on the PC 20, improving operability.

While the invention has been described in detail with reference to the above embodiments thereof, it would be apparent to those skilled in the art that various changes and modifications may be made therein without departing from the spirit of the invention.

Figure 4B:
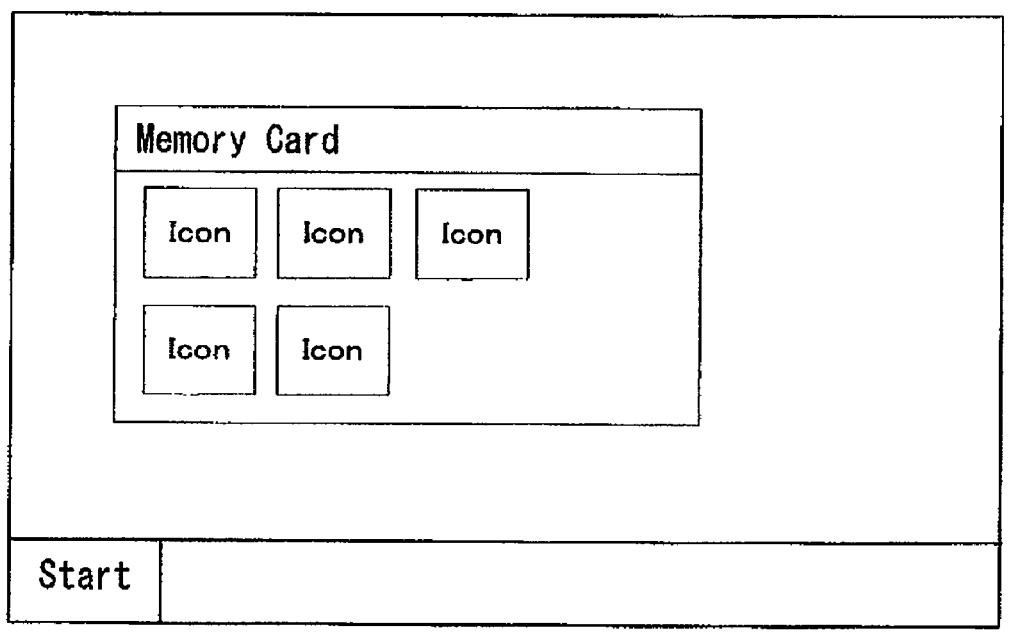
FIG. 4(b) is a view showing a window displayed on the liquid crystal display of the PC.
Figure 6:
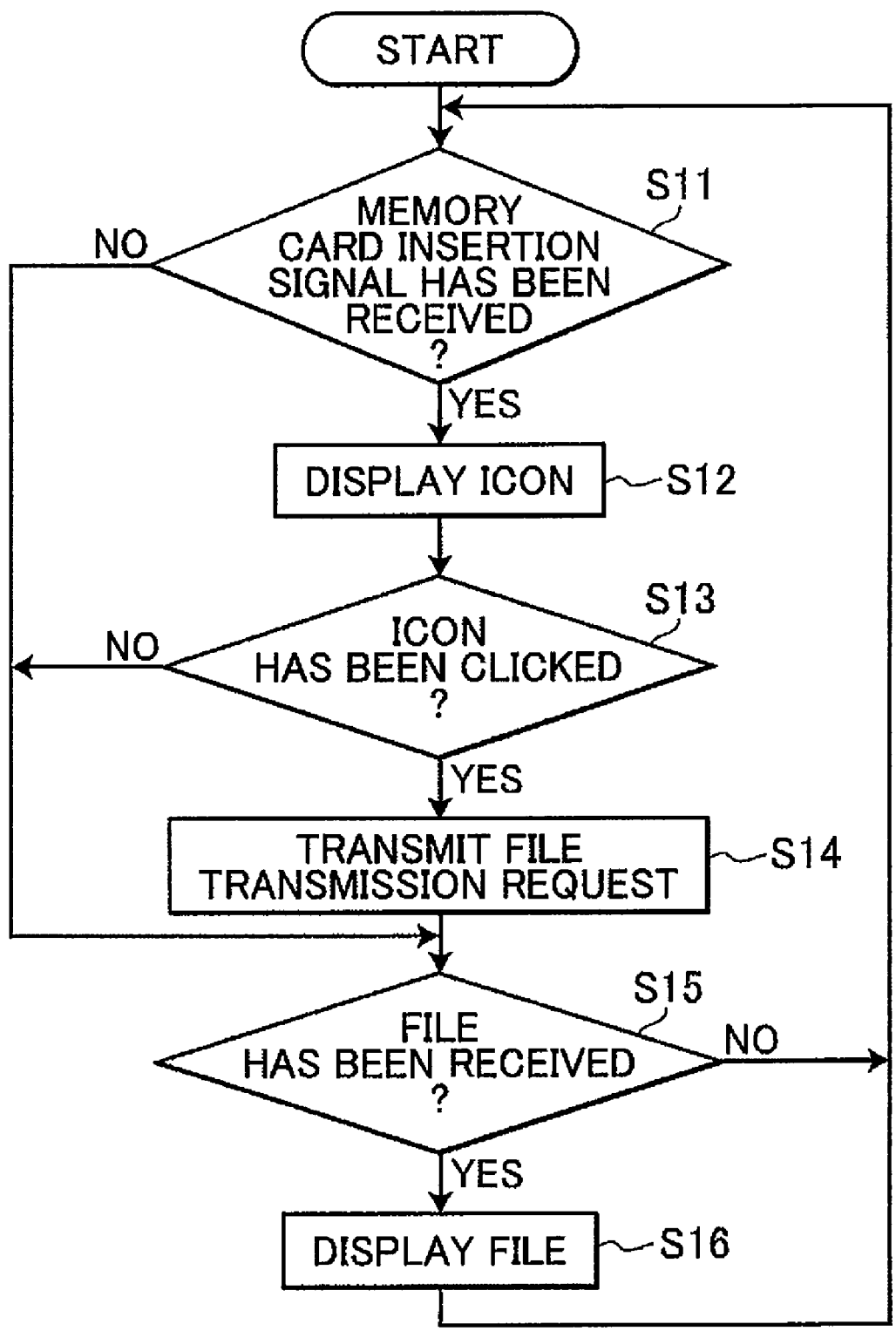
FIG. 6 is a flowchart representing processing executed in the PC.

For example, in the above embodiment, the icon shown in FIG. 4(a) is displayed in S12 of the flowchart in FIG. 6. However, a pop-up window as shown in FIG. 4(b) may be displayed instead. The pop-up window displays icons or thumbnails allowing a user to specify each file stored in the memory card 40. In this case, when the user clicks a desired icon or thumbnail, a file corresponding to the selected icon or thumbnail is transmitted from the MFP 1 to the PC 20.

In the above-described embodiment, the file transmission request signal is transmitted in S14 when an icon is clicked in S13 on the LCD 25. However, a file list transmission request signal may be transmitted instead. In this case, the MFP 1 transmits a file list to the PC 20 upon reception of the file list transmission request signal, enabling the PC 20 to display the icons or thumbnails as shown in FIG. 4(b). Then, when the user clicks a desired icon or thumbnail, a file corresponding to the selected icon or thumbnail may be transmitted from the MFP 1 to the PC 20.

Although the MFP 1 incorporates the card reader section 8 in the above-described embodiment, the invention may also be applied to another configuration. For example, a device having a single function as a card reader may be connected to a computer through such an interface as a USB interface, and the computer may be connected to another computer through the LAN 50.

In the above-described embodiment, the PC 20 refers to data (file) stored in the memory card 40 when the memory card 40 has been inserted into the MFP 1. However, the data stored in the memory card 40 may be stored in the hard disk 24 of the PC 20.

Although the application program for referring to data stored in the memory card 40 is activated in the PCs 20 when the memory card 40 has been inserted into the MFP 1 in the above embodiment, another configuration may be adopted.

For example, an application program for writing data into the memory card 40 may be activated in the PC 20. Specifically, when the memory card 40 storing examination questions at school is inserted into the card reader section 8 of the MFP 1, an application program for writing answers to the examination questions into the memory card 40 may be activated in each of PCs of students. In this case, the students may access and refer to the examination questions stored in the memory card 40 from their own PCs and write answers thereto.

Alternatively, an application program for updating current data stored in the PC 20 based on data stored in the memory card 40 inserted to the card reader section 8 of the MFP 1 may be activated in the respective PCs 20.

What is claimed is:

1. A removable media device capable of communicating with a plurality of network devices via a network, the removable media device comprising:
    an insert section into which a removable media is detachably insertable, the removable media storing identification information that identifies one of the network devices;
    an insertion detecting unit that detects the removable media inserted into the insert section;
    a reading unit that reads the identification information from the removable media when the insertion detecting unit has detected the removable media; and
    a notifying unit that, based on the identification information, notifies the one of the network devices of the insertion of the removable media.

2. The removable media device according to claim 1, further comprising a receiving unit that receives a transmission request through the network, and a transmission unit that transmits, through the network, data stored in the removable media in response to the transmission request.

3. The removable media device according to claim 1, wherein the reading unit reads a plurality of identification informations from the removable media, and the notifying unit notifies each of the network devices identified by the identification informations of the insertion of the removable media.

4. The removable media device according to claim 1, further comprising a selection unit that selects one of a plurality of identification informations, wherein the reading unit reads the selected identification information from the removable media and the notifying unit notifies each of the network devices identified by the identification information read from the memory card of the insertion of the removable media.

5. The removable media device according to claim 1, wherein the notifying unit further notifies the one of the network devices of a network address of the removable media device through the network.

6. A storage medium storing a set of program instructions executable on a removable media device capable of communicating with a plurality of network devices via a network and usable for controlling the removable media device, the instructions comprising:
    detecting insertion of a removable media into an insert section, the removable media storing identification information that identifies one of the network devices;
    reading the identification information from the removable media when the insertion of the removable media is detected; and
    notifying, based on the identification information, the one of the network devices of the insertion of the removable media.

7. The storage medium according to claim 6, wherein the instructions further comprise receiving a transmission request through the network, and transmitting, through the network, data stored in the removable media in response to the transmission request.

8. The storage medium according to claim 6, wherein a plurality of identification information is read from the removable media and a plurality of network devices identified by the identification information is notified of the insertion of the removable media.

9. The storage medium according to claim 6, wherein the instructions further comprise selecting one of a plurality of identification information, wherein the selected identification information is read from the memory card.

10. The storage medium according to claim 6, wherein the instructions further comprise notifying the one of the network devices identified by the identification information of a network address of the removable media device through the network.

11. A storage medium storing a set of program instructions executable on a network device and usable for controlling the network device the instructions comprising:
    detecting reception of a notification signal from a removable media device through a network, the notification signal indicating that a removable media has been mounted on the removable media device, the removable media storing identification information identifying the network device; and
    displaying information on a display when the reception of the notification signal has been detected, the information notifying that the removable media has been mounted on the removable media device.

12. The storage medium according to claim 11, wherein the instructions further comprise receiving data stored in the removable media through the network, and displaying the received data on the display.

13. The storage medium according to claim 12, wherein the instructions further comprise receiving a network address of the removable media device through the network, and transmitting a request signal to the removable media device based on the received network address, the request signal requesting the removable media device to transmit the data stored in the removable media.

14. The storage medium according to claim 13, wherein:
    the information displayed on the display is an icon indicating that the removable media has been mounted on the removable media device;
    the instructions further comprise detecting a selection of the icon; and
    the request signal is transmitted when the selection of the icon has been detected.

* * * * *